United States Patent [19]

Roling

[11] Patent Number: 4,473,364

[45] Date of Patent: Sep. 25, 1984

[54] SPROCKET WHEEL

[75] Inventor: Franz Roling, Lunen, Fed. Rep. of Germany

[73] Assignee: Gewerkschaft Eisenhutte Westfalia, Lunen, Fed. Rep. of Germany

[21] Appl. No.: 370,633

[22] Filed: Apr. 21, 1982

[30] Foreign Application Priority Data

Apr. 22, 1981 [DE] Fed. Rep. of Germany ....... 3115916

[51] Int. Cl.³ ...................... F16H 55/30; B63B 21/22; B63B 21/24
[52] U.S. Cl. .................................. 474/164; 114/210; 114/293; 474/152; 474/155
[58] Field of Search ............... 474/164, 152, 153, 155; 114/210, 293

[56] References Cited

U.S. PATENT DOCUMENTS 4,343,614 8/1982 Schulte ............................... 474/155

FOREIGN PATENT DOCUMENTS 1525047 4/1970 Fed. Rep. of Germany ...... 474/155
833365 4/1960 United Kingdom .

Primary Examiner—Lawrence J. Staab
Assistant Examiner—Michael D. Bednarek
Attorney, Agent, or Firm—Sughrue, Mion, Zinn, Macpeak & Seas

[57] ABSTRACT

A sprocket wheel has a plurality of equi-spaced circumferential teeth, each pair of adjacent teeth defining therebetween a pocket. The pockets are shaped to engage with the links of a drive chain. The teeth are formed with flanks at their edge faces which lead and trail during rotation of the sprocket wheel. The flanks merge with rounded faces which define bases of the teeth. The teeth are asymmetrically shaped in such a manner that the rounded faces associated with leading flanks each have a radius of curvature which is greater than the radius of curvature of each of the rounded faces associated with trailing flanks.

5 Claims, 4 Drawing Figures

SPROCKET WHEEL

BACKGROUND TO THE INVENTION

This invention relates to a sprocket wheel for driving and/or guiding a drive chain for a scraper-chain conveyor or a mineral winning machine such as a coal plough. The invention is particularly concerned with a sprocket wheel for use with a drive chain having chain links made from rod of circular cross-section.

Sprocket wheels of this type have a plurality of equi-spaced circumferential teeth. The adjacent teeth define pockets for the reception of the links of a drive chain. Each of the teeth is of two-part construction, the sprocket wheel being formed with a central circumferential groove which passes through all the teeth thereby defining their two-part construction. Alternate links of the chain lie within the pockets as the chain passes round the sprocket wheel, and the remaining links (which lie substantially at right-angles to the first-mentioned links) are accommodated in the groove. The two ends of each pocket are defined by flanks formed on the mutually-facing portions of the two parts of each of the teeth defining that pocket. The tooth flanks at the two ends of each pocket converge slightly, and define chain link bearing faces. The flanks merge with rounded faces which define the bases of teeth.

When a sprocket wheel of this type is used to drive the drive chain of a scraper-chain conveyor or a mineral winning machine, the links of the drive chain are subjected to extremely high loads. Despite the use of drive chain having increasingly heavier cross-sections and considerably improved quality, it has hitherto not been possible to increase the service life of drive chains to any appreciable extent. The pattern of the breakdowns that have occurred in use have lead to the conclusion that a considerable proportion of the damage done to the chain links is attributable to unsatisfactory co-operation between the chain links and the sprocket wheel.

The teeth of known sprocket wheels are of symmetrical shape, the radii of the rounded faces at the bases of the teeth being approximately equal to one half of the thickness of each chain link. This form of sprocket wheel has the advantages of being unaffected by the unavoidable variations in the sizes of the chain links that occur during manufacture, and of precluding jamming of the chain links against the teeth (which could make it difficult to remove the links from the pockets at the chain-outlet side of the sprocket wheel). Unfortunately, this type of sprocket wheel has the disadvantage that the first tooth of the sprocket wheel usually has to take up the entire tensile force of the chain. This results in considerable stress being concentrated at this tooth.

In order to distribute the tensile force of the chain over several teeth, a sprocket wheel is known in which the radii of the rounded faces at the bases of the teeth are increased so that they are about 20-80% larger than half the thickness of the chain links. Unfortunately, a sprocket wheel of this type can only be used when the variations in the sizes of the chain links are relatively small. Moreover, even though its teeth are symmetrical, there exists the danger of jamming between the chain links and the teeth. This type of sprocket wheel is described in DE-AS 2856099.

The aim of the invention is to provide a sprocket wheel which does not suffer from these disadvantages.

SUMMARY OF THE INVENTION

The present invention provides a sprocket wheel having a plurality of equi-spaced circumferential teeth, each pair of adjacent teeth defining therebetween a pocket, the pockets being shaped to engage with the links of a drive chain, the teeth being formed with flanks at their edge faces which lead and trail during rotation of the sprocket wheel, the flanks merging with rounded faces which define the bases of the teeth, wherein the teeth are asymmetrically shaped in such a manner that the rounded faces associated with leading flanks each have a radius of curvature which is greater than the radius of curvature of each of the rounded faces associated with trailing flanks.

Thus, with this sprocket wheel, the radius of each of the leading rounded faces at the bases of the teeth is considerably increased in size. This results in practically all the sprocket teeth that are engaged by links participating in the transmission of power. Moreover, the large and unavoidable variations in the sizes of the chain links that occur during manufacture, can be accommodated without any trouble.

Advantageously, the rounded faces associated with leading flanks each have a radius of curvature which is at least approximately twice the radius of curvature of each of the rounded faces associated with trailing flanks. Conveniently, the rounded faces associated with leading flanks each have a radius of curvature lying in the range of from 1 to 1.5 times the thickness of the chain links. Preferably, the rounded faces associated with leading flanks each have a radius of curvature which is approximately 1.25 times greater than the thickness of the chain links.

The rounded faces associated with trailing flanks may each have a radius of curvature which is approximately equal to half the thickness of the chain links. In this way, jamming of the chain links against the sprocket teeth is avoided.

The sprocket wheel of the invention is intended primarily for use in driving a scraper-chain conveyor, or for other chain-drives which operate at least mainly in one direction. However, this sprocket wheel can be used to drive a chain in the "wrong direction" (that is to say with the teeth having the rounded face bases of smaller radius of curvature leading). In this case, the sprocket wheel behaves in the same way as the known type of sprocket wheel whose tooth bases have radii of curvature approximately equal to half the thickness of the chain links.

BRIEF DESCRIPTION OF THE DRAWINGS

A sprocket wheel constructed in accordance with the invention will now be described, by way of example, with reference to the accompanying drawings, in which.

DESCRIPTION OF PREFERRED EMBODIMENTS

Figure 1:
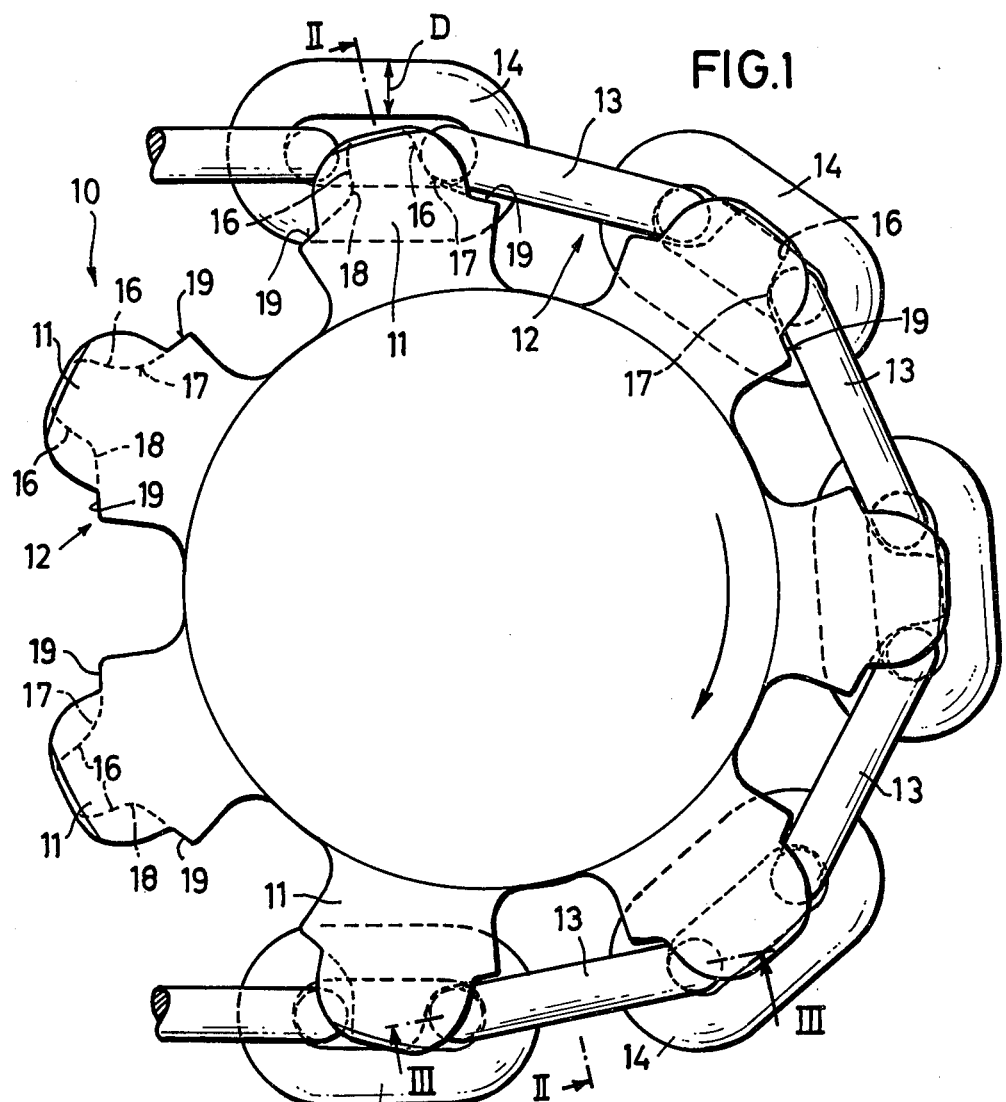
FIG. 1 is a side elevation of the sprocket wheel and part of a drive chain associated therewith.
Figure 2:
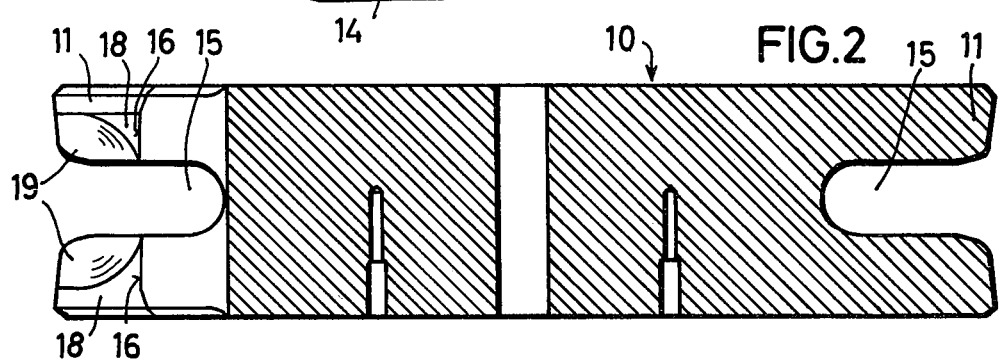
FIG. 2 is a cross-section taken on the line II—II of FIG. 1.

Referring to the drawings, FIG. 1 shows a sprocket wheel 10 which is used for driving and/or guiding a drive chain for a scraper-chain conveyor or a mineral winning machine such as a coal plough. For example, the sprocket wheel 10 could be fitted, in the manner of a crown wheel, to a hollow drum to form a sprocket drum for driving a scraper-chain conveyor. The sprocket wheel 10 has seven equi-spaced, peripheral teeth 11, which define pockets 12 therebetween. The pockets 12 are shaped to conform with the links of the drive chain, the links being made from rod of circular cross-section. The pockets 12 receive alternate links 13 of the drive chain, these links lying flat within the pockets. The remaining links 14 (which lie substantially at right-angles to the links 13) are accommodated in circumferential grooves 15 in the teeth 11. The grooves 15 divide the teeth 11 into two parts. The thickness of the links 13 and 14 as indicated by the dimension D, and the direction of rotation of the sprocket wheel 10 is indicated by the arrow U.

Figure 3:
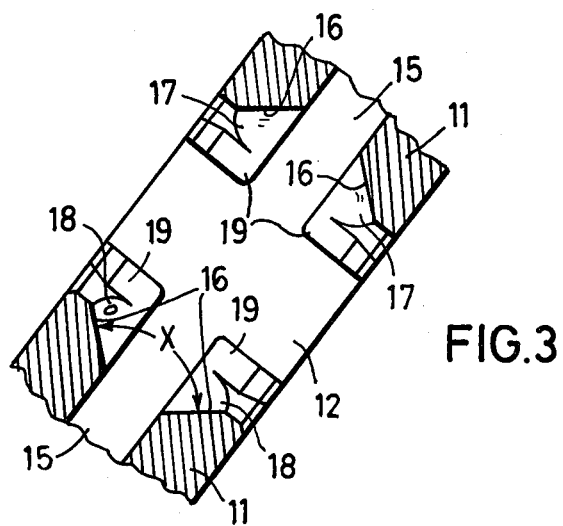
FIG. 3 is a cross-section taken on the line III—III of FIG. 1.

As best shown in FIG. 3, the teeth 11 are profiled to define the pockets 12. Thus, each pair of grooved adjacent teeth 11 have faces 19 forming the floor of the pocket 12 defined by those teeth, and flanks 16 which define the walls of that pocket. The flanks 16 at one end of each tooth 11 merge with their faces 19 by way of rounded faces 17, and the flanks 16 at the other end of each tooth merge with their faces 19 by way of rounded faces 18. The flanks 16 of the two parts of each of the teeth 11 are inclined (see FIG. 3) to one another at angle X which is about 100°. The flanks 16 engage the curved end portions of the links 13 to transfer drive to the chain from the sprocket wheel 10.

Figure 4:
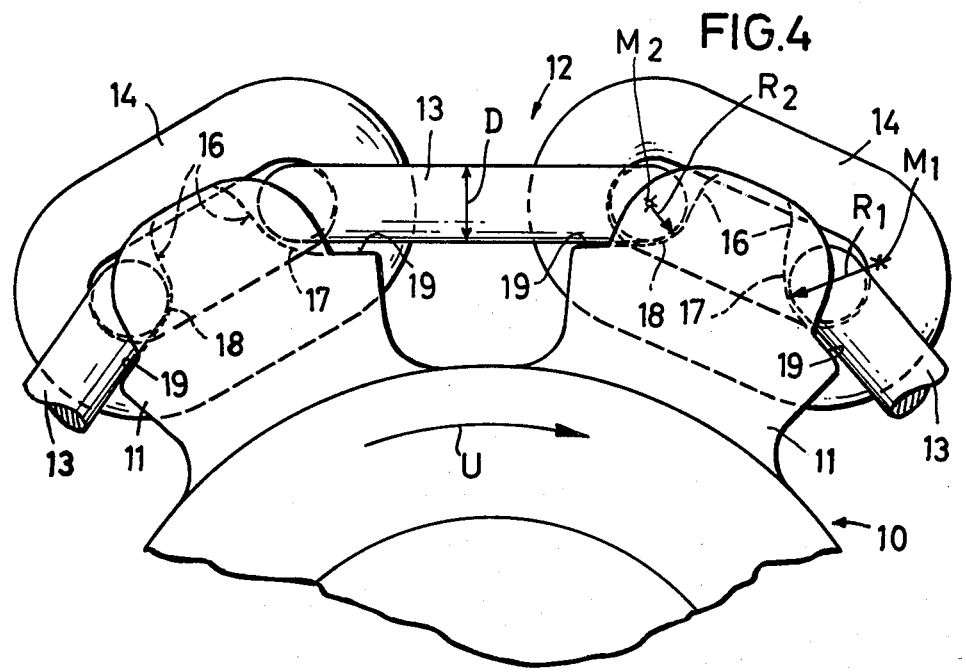
FIG. 4 is a side elevation, on a larger scale of part of the sprocket wheel and drive chain of FIG. 1.

As best shown in FIG. 4, each of the teeth 11 is asymmetrical in relation to its radial median plane, since the rounded faces 17, that lead during rotation in the direction U, have a considerably larger radius of curvature than do the rounded faces 18 that trail during rotation. As shown in FIG. 4, the leading faces 17 each have a radius of curvature $R_1$ whose centre point is $M_1$, and the trailing faces 18 each have a radius of curvature $R_2$ whose centre point is $M_2$. As mentioned above, $R_1$ is considerably larger than $R_2$, and preferably $R_1$ is at least twice $R_2$. The radius $R_2$ is preferably approximately equal to half the thickness D of the links 13 and 14. Thus, $R_1$ is at least 2 to 3 times greater than 0.5 D. Particularly good results are obtained if $R_1$ is approximately equal to 1.25 D.

Because of their asymmetrical shape, all the teeth 11 of the sprocket wheel 10 that are in engagement with chain links 13 participate in the transmission of drive to the chain. Moreover, this is possible irrespective of the unavoidable variations in the sizes of the chain links 13 and 14 that occur during manufacture. Furthermore, the asymmetrical shape of the teeth 11 prevents the links 13 from jamming against the teeth.

I claim:

1. A driving sprocket wheel and link drive chain combination wherein the links of the chain are driven by the driving sprocket wheel, comprising: a sprocket wheel having a plurality of equi-spaced circumferential teeth, each pair of adjacent teeth defining therebetween a pocket, the pockets being shaped to engage with the links of the drive chain, the teeth being formed at their opposite edge faces with leading and trailing flanks which lead and trail, respectively, during rotation of the sprocket wheel and which have rounded faces which are curved inwardly toward the center of the teeth to define the bases of the teeth, said flanks merging with said rounded faces, wherein the teeth are asymmetrically shaped in such a manner that the rounded faces associated with leading flanks each have a radius of curvature which is greater than the radius of curvature of each of the rounded faces associated with trailing flanks, and wherein said chain is engaged with said sprocket wheel in such a manner that the trailing ends of all of the chain links engaged in said pockets are contacted and driven by said rounded faces of the leading flanks of the respective teeth following said trailing ends of said links.

2. A sprocket wheel according to claim 1, wherein the rounded faces associated with leading flanks each have a radius of curvature which is at least approximately twice the radius of curvature of each of the rounded faces associated with trailing flanks.

3. A sprocket wheel according to claim 1, wherein the rounded faces associated with leading flanks each have a radius of curvature lying in the range of from 1 to 1.5 times the thickness of the chain links.

4. A sprocket wheel according to claim 3, wherein the rounded faces associated with leading flanks each have a radius of curvature which is approximately 1.25 times greater than the thickness of the chain links.

5. A sprocket wheel according to claim 2 or claim 3, wherein the rounded faces associated with trailing flanks each have a radius of curvature which is approximately equal to half the thickness of the chain links.

* * * * *